(12) United States Patent
Ghanwani et al.

(10) Patent No.: US 9,906,442 B2
(45) Date of Patent: Feb. 27, 2018

(54) SYSTEMS AND METHODS FOR INCREASING THE MULTIPROTOCOL LABEL SWITCHING STACK

(71) Applicant: DELL PRODUCTS L.P., Round Rock, TX (US)

(72) Inventors: Anoop Ghanwani, Rocklin, CA (US); Sanjay Sane, Fremont, CA (US); Shivakumar Sundaram, Chennai (IN); Krishnamurthy Subramanian, Saratoga, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 157 days.

(21) Appl. No.: 14/689,609

(22) Filed: Apr. 17, 2015

(65) Prior Publication Data

US 2016/0308761 A1    Oct. 20, 2016

(51) Int. Cl.
*H04L 12/723* (2013.01)
*H04L 12/741* (2013.01)
*H04L 12/781* (2013.01)
*H04L 12/733* (2013.01)

(52) U.S. Cl.
CPC ............ *H04L 45/50* (2013.01); *H04L 45/52* (2013.01); *H04L 45/54* (2013.01); *H04L 45/122* (2013.01)

(58) Field of Classification Search
CPC .......... H04L 45/50; H04L 45/52; H04L 45/54
See application file for complete search history.

(56) References Cited

U.S. PATENT DOCUMENTS

| | | | | |
|---|---|---|---|---|
| 6,339,595 B1* | 1/2002 | Rekhter | .............. | H04L 12/4645 370/392 |
| 6,408,001 B1* | 6/2002 | Chuah | ................ | H04Q 11/0478 370/229 |
| 6,886,043 B1* | 4/2005 | Mauger | .................. | H04L 45/50 370/392 |
| 7,009,983 B2* | 3/2006 | Mancour | .......... | H04L 29/12009 370/401 |
| 7,301,949 B2* | 11/2007 | Eriksson | ............. | H04L 12/4616 370/352 |
| 7,319,699 B1* | 1/2008 | Provine | ............... | H04L 12/4633 370/395.3 |
| 7,336,648 B1* | 2/2008 | Sasagawa | ............... | H04L 12/66 370/230 |
| 7,386,605 B2* | 6/2008 | Shah | ................... | H04L 12/4641 370/401 |

(Continued)

OTHER PUBLICATIONS

E. Rosen et al., Network Working Group, "MPLS Label Stacking Encoding," Jan. 2001, RFC 3032, URL:http//datatracker.ietf.org/wg/spring/documents/ (46pgs).

(Continued)

*Primary Examiner* — Gregory Sefcheck
(74) *Attorney, Agent, or Firm* — North Weber & Baugh LLP

(57) ABSTRACT

Aspects of the present invention include increasing the number of hops that can be specifically defined in a multi-protocol label switching stack. In embodiments of the present invention, a label space can be used to represent two or more labels. In embodiments of the present invention, the label space can be used by concatenating two or more labels and redefining the multiprotocol label switching stack operations and outgoing labels.

20 Claims, 6 Drawing Sheets

(56) References Cited

U.S. PATENT DOCUMENTS

| | | | | |
|---|---|---|---|---|
| 7,388,828 B2* | 6/2008 | Nakash | H04L 12/437 | 370/218 |
| 7,496,688 B2* | 2/2009 | Pepper | H04L 69/22 | 370/236 |
| 7,616,632 B2* | 11/2009 | Loa | H04L 45/00 | 370/252 |
| 7,668,166 B1* | 2/2010 | Rekhter | H04L 12/4645 | 370/392 |
| 8,014,317 B1* | 9/2011 | Ghosh | H04L 12/4633 | 370/254 |
| 8,134,917 B2* | 3/2012 | Fredette | H04L 45/00 | 370/218 |
| 8,144,710 B2* | 3/2012 | McGuire | H04L 12/4633 | 370/392 |
| 8,456,982 B2* | 6/2013 | Xu | H04L 41/0659 | 370/217 |
| 8,514,744 B2* | 8/2013 | Ghosh | H04L 12/4633 | 370/254 |
| 8,559,431 B2* | 10/2013 | Lam | H04L 12/4641 | 370/392 |
| 8,619,769 B2* | 12/2013 | Sandstrom | H04L 45/00 | 370/389 |
| 8,711,838 B1* | 4/2014 | Guichard | H04L 12/4633 | 370/351 |
| 8,811,388 B2* | 8/2014 | Fedyk | H04L 45/02 | 370/354 |
| 8,948,032 B1* | 2/2015 | Sampath | H04L 12/4641 | 370/252 |
| 9,258,227 B2* | 2/2016 | Ghosh | H04L 12/4633 | |
| 9,350,654 B1* | 5/2016 | Gredler | H04L 45/507 | |
| 9,356,866 B1* | 5/2016 | Sivaramakrishnan | H04L 45/7453 | |
| 9,438,473 B2* | 9/2016 | Kompella | H04L 41/0668 | |
| 9,461,910 B2* | 10/2016 | Kini | H04L 45/28 | |
| 9,467,367 B2* | 10/2016 | Bryant | H04L 45/50 | |
| 2005/0232188 A1* | 10/2005 | Sakamoto | H04L 45/24 | 370/328 |
| 2006/0182127 A1* | 8/2006 | Park | H04L 45/00 | 370/400 |
| 2008/0253379 A1* | 10/2008 | Sasagawa | H04L 12/66 | 370/395.5 |
| 2012/0051212 A1* | 3/2012 | Xu | H04L 41/0659 | 370/223 |
| 2013/0201990 A1* | 8/2013 | Lu | H04L 12/2856 | 370/392 |
| 2014/0294007 A1* | 10/2014 | Sakumoto | H04L 45/50 | 370/392 |
| 2016/0234110 A1* | 8/2016 | Garcia-Luna-Aceves | H04L 45/74 | |

OTHER PUBLICATIONS

Source Packet Routing in Networking (spring), URL: http://tools.ietf.org/html/rfc3032 (2pgs).

* cited by examiner

SYSTEMS AND METHODS FOR INCREASING THE MULTIPROTOCOL LABEL SWITCHING STACK

BACKGROUND

Field of Invention

The present invention relates generally to data communication networks and devices, and relates more particularly to source packet routing in data communications networks.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems provide increasingly more central and critical operations in modern society, it is important that the networks are reliable. One method used to improve reliability is to provide redundant links between network devices. By employing redundant links, network traffic between two network devices that would normally be interrupted can be re-routed to the back-up link in the event that the primary link fails.

Multiprotocol Label Switching (MPLS) is a mechanism in high-performance telecommunications networks that directs data from one network node to the next based on fixed size, 20-bit labels that are looked up as an exact match, rather than long network addresses (typically 32 or 128 bits) that are looked up as a longest prefix match, avoiding complex lookups in a routing table. The labels identify virtual links (paths) between distant nodes rather than endpoints. MPLS can encapsulate packets of various network protocols.

In an MPLS network, data packets are assigned labelstack. The switches are referred to as LSRs (label switch routers). Packet-forwarding decisions at intermediate LSRs are made solely on the contents of the top label in the stack, without the need to examine the packet itself. Packet forwarding decisions at edge LSRs may involve lookups on other headers in the packet (e.g. MAC addresses, Virtual Local Area Networks (VLANs) and/or IPv4/IPv6 addresses). There are one or more labels in a label stack.

Most hardware used in MPLS networks has limits on the number of labels that can be pushed (at ingress) or parsed (in the core). Parsing in the core gets to the Internet Protocol (IP) and transport headers (e.g. Transmission Control Protocol (TCP) or User Datagram Protocol (UDP)) for efficient hashing of traffic flows on to links in a link aggregation or equal-cost multipath group. Alternatively, the entropy label may be used but it further reduces the usable label stack.

Technologies such as Source Packet Routing In Networking (SPRING) require the ingress to push a number of labels equal to the number of hops that the packet will traverse in the network. SPRING is a source routing technology that allows the source to specify any path, including a nonshortest path, which can be used for certain applications such as efficient load balancing. One of the technologies used for implementing SPRING is MPLS. When MPLS is used, in general, for n explicit hops, the ingress must push n labels. There are other ways to reduce the number of labels that need to be pushed; e.g. using a single label to represent a concatenation of multiple hops, sometimes referred to as "segments," but this results in added complexity.

In MPLS-based SPRING, each label can be used to represent a hop. A certain path can be represented with a stack of labels where each label represents a hop. So the number of labels restricts the number of hops that can be specified. With the prior art hardware, the number of labels that can be pushed, n, is limited to a small number and thus restricts the number hops. For some hardware the limitation for n is 3. Therefore, only three hops can be explicitly specified.

One disadvantage of the present system is that the number of hops is limited by the number of labels that can be pushed.

Accordingly, what is needed are systems and methods that can address the deficiencies and limitations of the current hardware.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DETAILED DESCRIPTION OF THE PREFERRED EMBODIMENTS

Figure 1A:
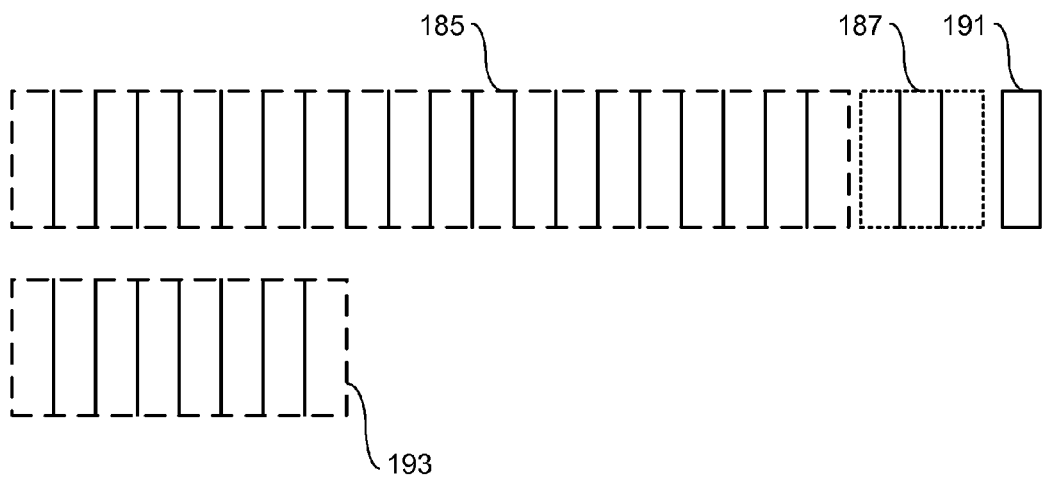
FIG. 1A depicts an example of a data structure used in MPLS.

In the following description, for purposes of explanation, specific examples and details are set forth in order to provide an understanding of the invention. It will be apparent, however, to one skilled in the art that the invention may be practiced without these details. Well known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media can result in, among other advantages, the ability to deploy power measurement on a component level in a live network or to design network devices.

It shall also be noted that although embodiments described herein may be within the context of power consumption in a network device, the invention elements of the current patent document are not so limited. Accordingly, the invention elements may be applied or adapted for use in other contexts.

Embodiments of the present invention can double the limitation imposed by the hardware label capacity. In many prior art hardware systems, the current limitation is 3 labels. However, even if the limitation were greater than 3, embodiments of the present invention can be employed to double the limitation.

The current label size in MPLS is 20 bits. The current hardware limitation is to 3 labels. Therefore, the number of hops that can be specified is limited to 3. Most networks have much less than one million nodes, which means a 20-bit label is overkill for this application (MPLS-based SPRING). In a simple case, each node gets an MPLS label. Thus, 3 hops is very limiting.

Embodiments of the present invention partition the label space into two labels. Using the current 20 bit label size, each of the two labels would be 10 bit labels. However, one of ordinary skill in the art would understand that any number of bits can used. For the purpose of this specification, each label will be shown as 10 bits. Also, one of ordinary skill in the art will recognize that the label space can be broken out into more than two labels, for example, three 6 bit labels can be used within the 20 bits.

A 10 bit label allows for up to about 1000 routers. Each label would represent a concatenation of two labels L1 and L2. The top label (L1) is in the 10 most significant bits (MS-bits). The next label (L2) is in the 10 least significant bits (LS-bits). If the top level label appears by itself, it has the 10 LS-bits set to zero.

FIG. 1A depicts an example of a data structure used in MPLS. The label structure 180 includes a 20 bit label value 185, 3 bits for experimental use 187, a bottom of the stack bit 191, and 8 bits used for time to live 193. The 20 bit label value 185 is used to store the label value. The bottom of the stack bit 191 is used to indicate whether or not it is the last label on the stack. The experimental bits 187 are reserved for experimental use. The time to live bits 193 are used to encode a time to live value.

Figure 1B:
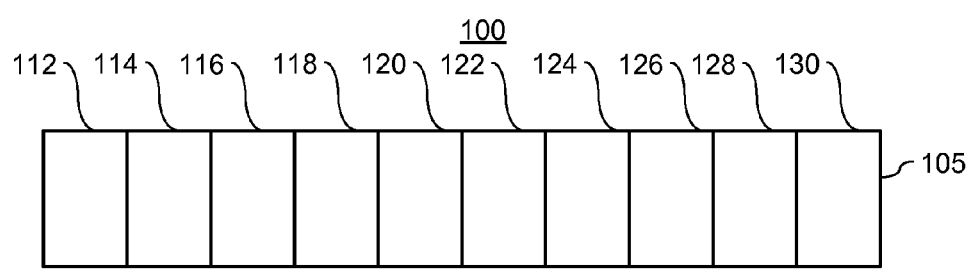
FIG. 1B depicts an example of a data structure of a label according to embodiments of the present invention.
Figure 1B:
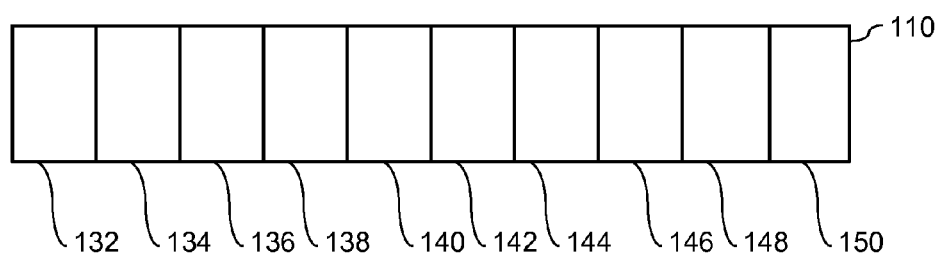

FIG. 1B depicts an example of a data structure of a label according to embodiments of the present invention. FIG. 1 shows label 100 including the 10-bit label L1 105 in the MS-bits and the 10-bit label L2 110 in the LS-bits. In the embodiment shown in FIG. 1, L1 is comprised of 10 most significant bits 112, 114, 116, 118, 120, 122, 124, 126, 128, and 130 and L2 is comprised of 10 least significant bits 132, 134, 136, 138, 140, 142, 144, 146, 148, and 150.

Using the data structure of FIG. 1B a device that can handle 3 labels will be able to encode a specific path for 6 hops. In the embodiment of FIG. 1B, label 100 represents a concatenation of two labels, L1 and L2. For ease of notation purpose, it will be referred to herein as L1-L2.

This concatenation requires some changes to the way in which labels are handled and are forwarded. Typically, a single 20-bit label is the only label encoded within a single MPLS label stack entry as defined in RFC 3032 (which can be found at https://tools.ietf.org/html/rfc3032). To encode six labels in the stack (top to bottom) embodiments of the present invention would have: <L1><L2><L3><L4><L5><L6>. In the notation used herein, the labels can be encoded in a stack, where the leftmost one is the top of the stack and the rightmost one is the bottom of the stack.

Using the 10-bit labels of the embodiment shown in FIG. 1, embodiments of the present invention have 2 labels in each MPLS label stack entry. Thus, the six labels would be encoded as: <L1-L2><L3-L4><L5-L6>, where L1 is the top of the stack label and L6 is the bottom of the stack label.

If there are an odd number of labels, then the top label would only have the 10 LS-bits set to some value, and the MS-bits would be set to zero; a zero label is effectively the same as an "Explicit NULL" label as defined in RFC 3032. When there is an explicit null label, that is an indication for the LSR to pop the top level label and what remains is the label below it. For example, if a packet comes in with <L1-L2> and the goal is to pop L1 and forward the packet, the outgoing packet would be represented as <0-L2>. The EXP, Time to Live (TTL) and Bottom of the Stack (BoS) bits operate as defined by MPLS in RFC 3032.

In embodiments of the present invention, special labels are ignored, for example the entropy label. They are not common and not "required."

In MPLS operation, when a labeled packet arrives at an LSR, the action can be one of the following: swap, pop and forward, or pop and look at next label/header. The "swap" operation refers to an incoming label being swapped for an outgoing single label or an entire label stack, for example, incoming label L1 is swapped for outgoing label L2 or label stack <L2><L3> . . . <Ln>. The "pop and forward" operation refers to an incoming label L1 being popped and the next hop is already known. Pop and forward is commonly used for Penultimate Hop Pop (PHP). PHP is a technology defined in MPLS that allows the last hop router to be a router that does not support the "pop and lookup" and/or the "pop and forward" operations. A penultimate hop router is responsible for popping the label to and forwarding the packet to the final hop router.

The "pop and look at next label or header" operation refers to the following. An incoming label L1 is popped. The router checks to see if it is the BoS label. If the BoS label, then lookup next label, else lookup next header. A header could be Media Access Control (MAC) or Internet Protocol (IP) depending on how the protocol was setup.

For an incoming non-MPLS packet at an edge LSR, the action would be "push." A new label stack of one or more labels is pushed into the packet and it is forwarded.

Embodiments of the present invention modify the standard operations described above, but taking advantage of using the existing hardware. Since the label can be a concatenation of two labels, the operations are handled differently. For the push operation, the label stack is pushed. The label compression can start with the bottom of the stack labels. Thus, an even number of labels is pushed as <L1-L2><L3-L4> . . . ; an odd number of labels is pushed as <0-L1><L2-L3> . . . .

Embodiments of the present invention use a regular 20-bit label lookup for all forwarding operations of MPLS encoded packets using existing hardware. Other embodiments of the present invention use hardware to forward less than 20 bit labels, for example, 10 bit labels.

In the common case, the Label Forwarding Information Base (LFIB) is implemented as a 20-bit exact match table. Therefore, embodiments of the present invention will need to look-up all 20 bits in the top label even when only the most significant or least significant 10 bits are used.

First, the label of interest (top label) is always guaranteed to appear either in the 10 LS-bits by itself (with the 10 MS-bits of 0) or in the 10 MS-bits along with a label of one of that LSR's next-hops in the 10 LS-bits. A given LSR knows all of its nexthops via the Interior Gateway Protocol (IGP) that is used to advertise these labels. If an SDN controller is used to program these entries, then the SDN controller would also be aware of the entire network topology and the labels that correspond to each of the LSRs.

For the example where the label appears by itself or there is only one label encoded in the concatenation, the swap and pop operations are as follows. The swap operation comes in with one label and goes out with another label. So for the swap operation, incoming label <0-L1> could become outgoing label <0-Ln>, where Ln is the label advertised by the nexthop (note that the swap operation is not commonly used in SPRING). For the pop and forward operation, a lookup would be done on the incoming label <0-L1> and the result would be to pop the label and forward the packet. The nexthop is already known and the pop and forward operation is complete. Here, since there is only one label encoded, the operation is unchanged. For the pop and lookup operation, the incoming label <0-L1> is looked-up in the LFIP. The result can indicate to pop & lookup the next label in the stack. Again, in this example, there is only one label encoded in the concatenated label so the operation is unchanged. For the example where the label appears with the next hop label, i.e. there are two labels concatenated, the operations are modified as follows. For the swap operation the incoming label <L1-L2> will be swapped for <Ln-L2>. The top level label, L1, got swapped to the value Ln, but the next level label, L2, was retained. The 10 LS-bits are retained. The operation of swapping a 10-bit label in the 10 MS-bits of the label stack entry can be achieved using existing hardware.

The pop & forward operation can be implemented as a swap. The label <L1-L2> can have L1 popped and L2 is retained and the packet forwarded. So the outgoing label is <0-L2> and the packet is forwarded. Thus, the pop and forward operation for 10-bit labels can be implemented as a swap operation in the existing hardware.

The pop and lookup can be implemented as a swap in the existing hardware. A lookup is performed on incoming label <L1-L2> (note that this step automatically includes the lookup for the next level label L2), swap it for outgoing label <0-L2> and forward the packet. Thus a separate lookup for L2 is not needed and what would normally have been implemented as a pop followed by a lookup on the next label in the label stack is implemented as a swap operation.

For the example where MPLS started out with the first (local) label by itself which indicated a pop, the next label may now have 2 possibilities. One, the nexthop is encoded by itself. <0, Ln>—for that case, there is one entry for each possible nexthop. Two, the nexthop is encoded with the next-nexthop.

For each nexthop, there are x entries of the form:
<Ln, Lm>
<Ln, Lm+1>
<Ln, Lm+2>

Where Ln is the nexthop label, and Lm, Lm+1, . . . are the next-nexthops reachable from the LSR that advertised Ln. The above operation modifications are described further below in reference to FIG. 2 and Tables 1 and 2.

Figure 2:
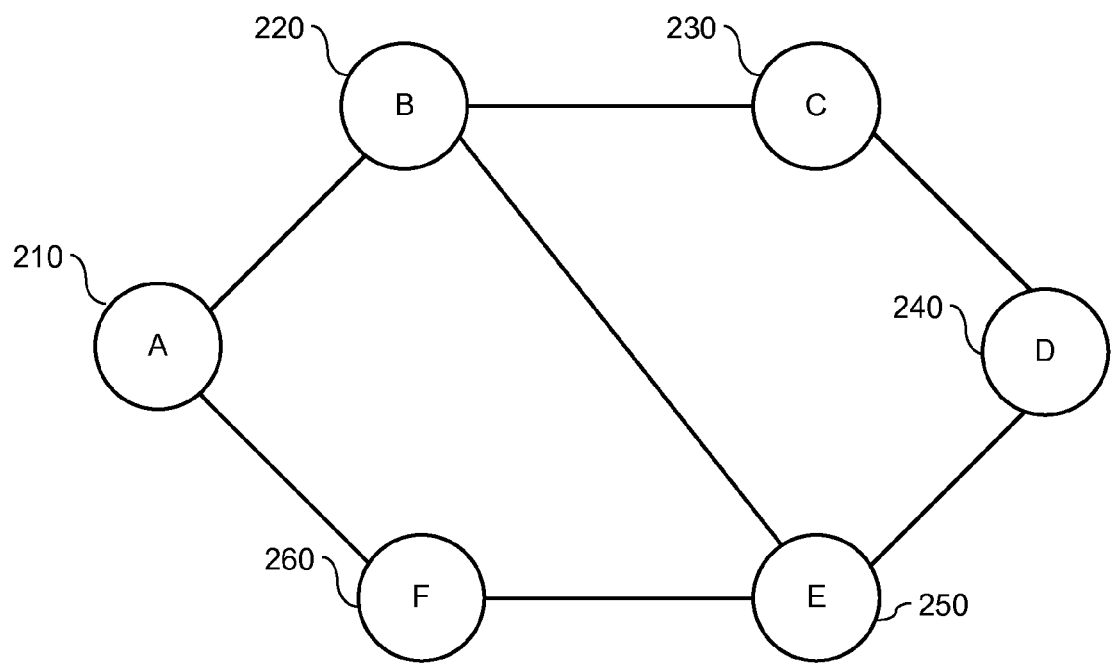
FIG. 2 depicts a block diagram according to embodiments of the present invention.

FIG. 2 depicts a block diagram according to embodiments of the present invention. FIG. 2 shows six MPLS LSRs, A 210, B 220, C 230, D 240, E 250, and F 260.

Table 1 shows an incoming label, outgoing label, action, and remarks for various operations in relation to FIG. 2 and LSR A. The table sets up the various incoming labels and the corresponding actions. For example, if the incoming label stack is <A-B>, then A is popped and the packet is forwarded to B, the nexthop. The action itself is implemented as a swap as described above. If the incoming label is <A-F>, then A is popped and the packet is forwarded to F, the nexthop. The action is implemented as a swap.

TABLE 1

| Incoming Label | Outgoing Label | Action | Remarks |
|---|---|---|---|
| <0-A> | — | Pop and Lookup | |
| <A-B> | <0-B> | Swap | A is popped, B is nexthop |
| <A-F> | <0-F> | Swap | A is popped, F is nexthop |
| <0-B> | <0-B> | Swap | Forward to B, B is the only label |
| <B-C> | <B-C> | Swap | Forward to B, B encoded with next-nexthop C |
| <B-E> | <B-E> | Swap | Forward to B, B encoded with next-nexthop E |
| <0-F> | <0-F> | Swap | Forward to F, F is only label |
| <F-E> | <F-E> | Swap | Forward to F, F is encoded with next-nexthop E |
| * | NA | Discard | All other labels are illegal |

Table 2 shows an incoming label, outgoing label, action, and remarks for various operations in relation to FIG. 2 and LSR A for the case where PHP is in use. The table sets up the various incoming labels and the corresponding actions. When using PHP, LSRs A 210 and B 220 should not appear in the incoming label since the previous router should have popped it.

TABLE 2

| Incoming Label | Outgoing Label | Action | Remarks |
|---|---|---|---|
| <0-A> | — | Pop and Lookup | Should never be needed |
| <A-B> | — | Pop and Lookup | A and B are popped, B is nexthop; should not happen |
| <A-F> | — | Pop and Lookup | A and F are popped, F is nexthop; should not happen |
| <0-B> | — | Pop and Forward | B is popped, B is nexthop |
| <B-C> | <0-C> | Swap | B is popped, C is retained (C is next-nexthop), B is nexthop |
| <B-E> | <0-E> | Swap | B is popped, E is retained (E is next-nexthop), B is nexthop |
| <0-F> | — | Pop and forward | F is popped, F is nexthop |
| <F-E> | <0-E> | Swap | F is popped, E is retained (E is next-nexthop), F is nexthop |
| * | NA | Discard | All other labels are illegal |

Tables 1 and 2 can both be stored in a memory at LSR A 210, for example. In the above example, each LSR in FIG. 2 can have a memory storing tables similar to Tables 1 and 2.

Figure 3:
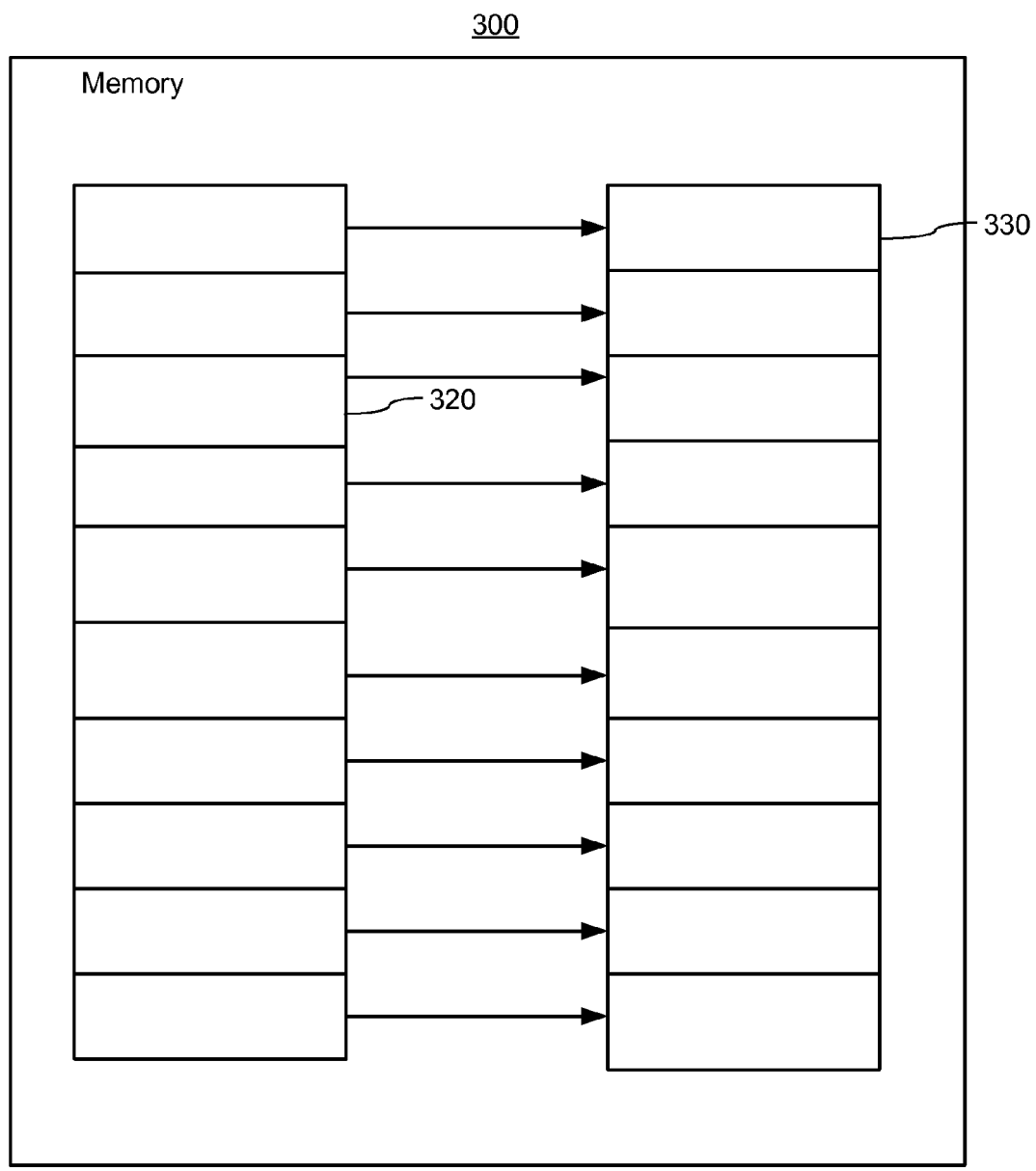
FIG. 3 depicts a block diagram of a memory according to embodiments of the present invention.

FIG. 3 depicts a block diagram of a memory according to embodiments of the present invention. FIG. 3 shows a memory 300 within a LSR A 210, B 220, C 230, D 240, E 250, or F 260 shown in FIG. 2. Memory 300 includes table 320 with individual 20 bit label entries and action table 330. Label table 320 points to an action in action table 330. Action table 330 can be Table 2 shown above. For example, router A 210 can have Table 1 and Table 2. Label table 320 can include the concatenation of labels described above.

Figure 4:
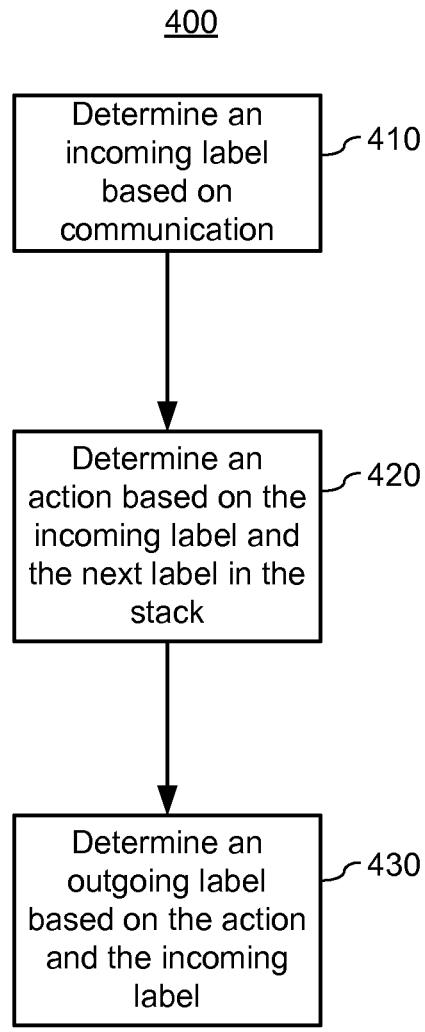
FIG. 4 depicts a flowchart used to implement increased label capacity according to embodiments of the present invention.

FIG. 4 depicts a flowchart used to implement increased label capacity according to embodiments of the present invention. FIG. 4 shows determining an incoming label based on communication 410, determining an action based on the incoming label and the next label in the stack 420, and determining an outgoing label based on the action and the incoming label 430. As described above in reference to tables 1 and 2, an incoming label is used to determine an action and determine the outgoing label.

Figure 5:
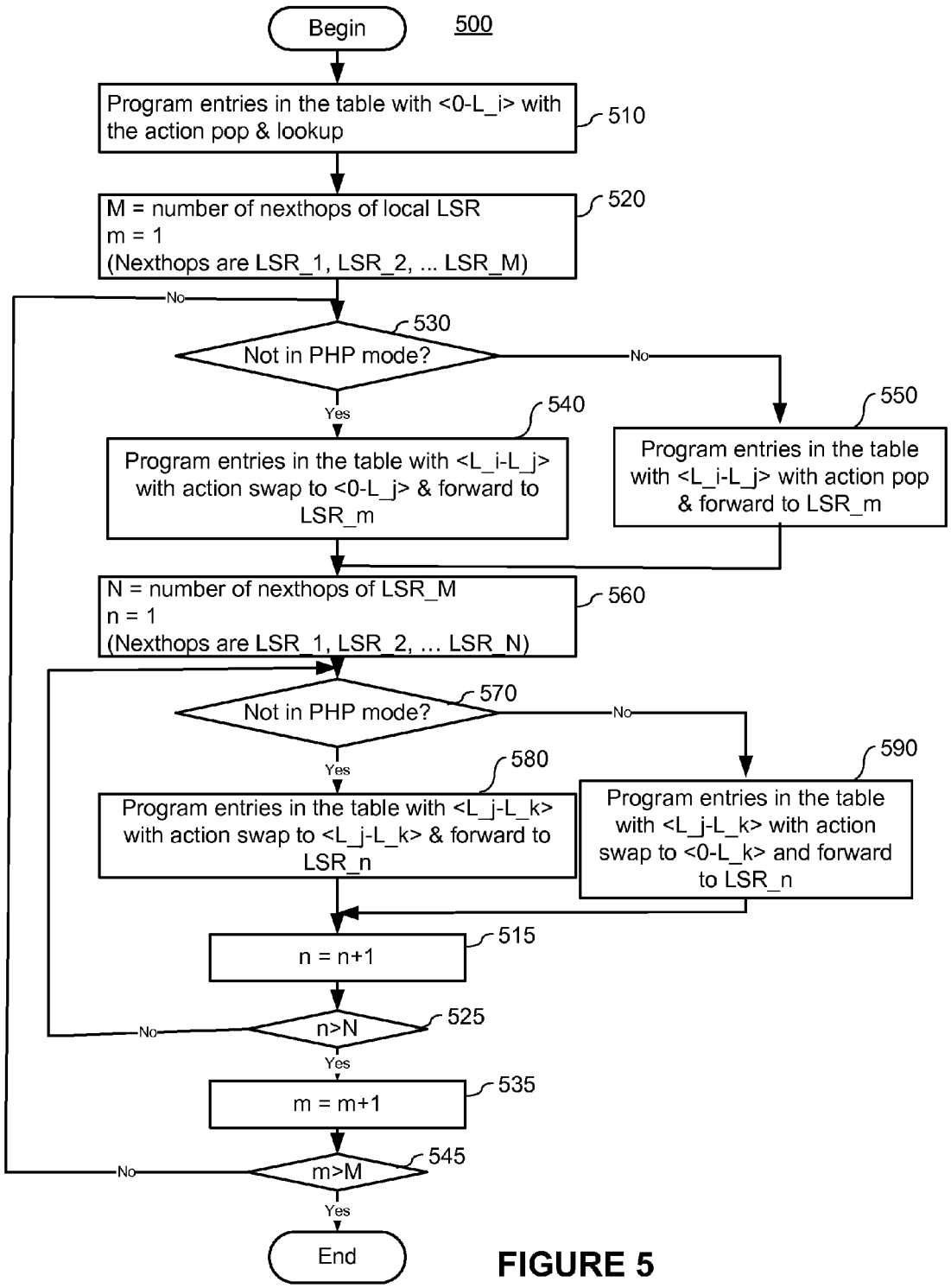
FIG. 5 depicts a flowchart used to implement a label forwarding table according to embodiments of the present invention.

FIG. 5 depicts a flowchart used to implement a label forwarding table according to embodiments of the present invention. FIG. 5 shows the method used to program the label forwarding table that is used by the flowchart shown in FIG. 4.

In FIG. 5, the notation L_i is used to denote any instance of a label advertised by the local LSR. The notation L_j is used to denote any instance of a label advertised by a nexthop of the local LSR. The notation L_k is used to denote any instance of a label advertised by a next-nexthop of the local LSR. When referring to programming entries such <L_i-L_j> for neighbor m, it is assumed that all possible label combinations for L_i advertised by the local LSR and L_j advertised by the nexthop LSR_m will be programmed.

FIG. 5 shows process 500 for generating label forwarding tables according to embodiments of the present invention. FIG. 5 shows programming entries in the table with <0-L_i> with the action pop & lookup 510. Where M equals the number of nexthops of the local LSR and nexthops are LSR_1, LSR_2, . . . , LSR_M and counter m is initialized to 1 520. Check that the local LSR is not in PHP mode 530. If the local LSR is not in PHP mode, then program entries in the table with <L_i-L_j> with action swap to <0-L_j> & forward to LSR_m 540. If the local LSR is in PHP mode, then program entries in the table with <L_i-L_j> with action pop & forward to LSR_m 550.

N equals the number of nexthops of LSR_m (i.e. an LSR that is exactly two hops from the local LSR reachable via LSR_m), and counter n is initialized to 1 560. Check that the local LSR is not in PHP mode 570. If the local LSR is not in PHP mode, then program entries in the table with <L_j-L_k> with action swap to <L_j-L_k> & forward to LSR_n 580. If the router is in PHP mode, then program entries in the table with <L_j-L_k> with action swap to <0-L_k> and forward to LSR_n 590. Increment counter n 515, check if n>N 525 and if so increment counter m 535. If not, go back to checking if not in PHP mode 570 and continue for the next neighbor LSR_n of neighbor LSR_m of the local LSR. Check if m>M 545. If so, end. If not, go back to checking if not in PHP mode 530 and continue for next neighbor LSR_m of local LSR.

Figure 6:
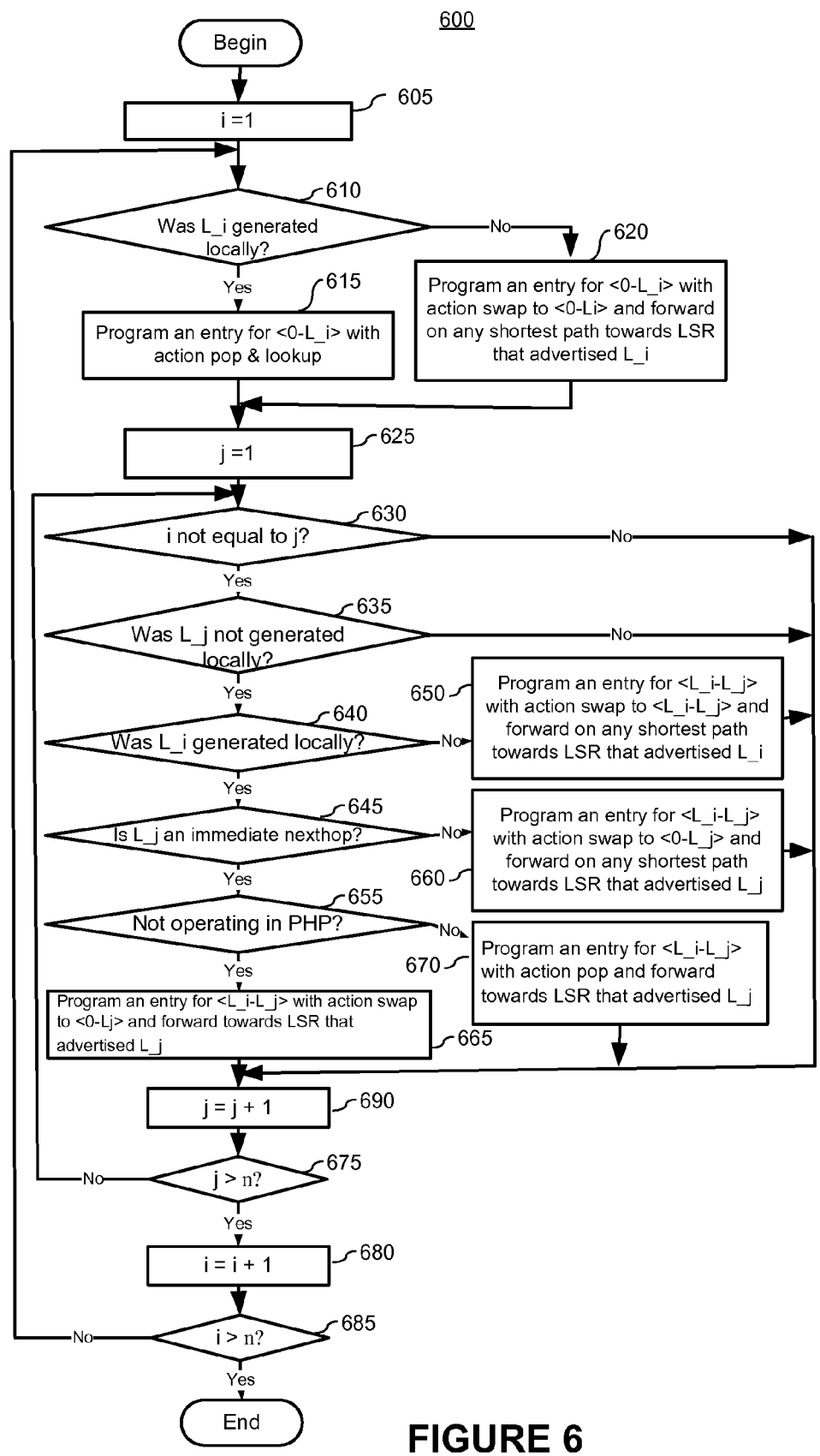
FIG. 6 depicts a flowchart used to implement a label forwarding table according to embodiments of the present invention.

FIG. 6 depicts a flowchart used to implement a label forwarding table according to embodiments of the present invention. FIG. 5 shows an embodiment implemented when all paths in the network are specified in packets by listing every hop explicitly in the packet. In embodiments where loose source routing is acceptable or desirable, then process 600 shown in FIG. 6 can be used for programming the table. In the embodiment shown in FIG. 6, L={L_1, L_2, . . . , L_n} are labels advertised by any of the LSRs in the network.

FIG. 6 shows initializing counter i to one 605. Check that label L_i was generated by the local LSR 610. If L_i was generated locally, then program an entry for <0-L_i> with action pop & lookup 615. If L_i was not generated locally, then program an entry for <0-L_i> with action swap to <0-Li> and forward on any shortest path towards LSR that advertised L_i 620. Initialize counter j to one 625. Check if i equals j 630. If i is equal to j, then do nothing. If i is not equal to j, then check if L_j was not generated by the local LSR 635. If L_j was not generated by the local LSR, then check if L_i was generated by the local LSR 640. If L_i was generated locally, then check if L_j is an immediate nexthop

645. If L_i was not generated locally, then program an entry for <L_i-L_j> with action swap to <L_i-L_j> and forward on any shortest path towards LSR that advertised L_i 650. If L_i was generated locally and if Lj is not an immediate nexthop, the program an entry for <L_i-L_j> with action swap to <0-Lj> and forward along any shortest path towards the LSR that advertised L_j 660. If L_i was generated locally, and if L_j is an immediate nexthop, then check if not operating in PHP 655. If not operating in PHP mode, program an entry for <L_i-L_j> with action swap to <0-L_j> and forward to LSR that advertised L_j 665. If operating in PHP, then program an entry for <L_i-L_j> with action pop and forward to LSR that advertised L_j 670. Increment counter j 690. Check if j>n 675. If j is not greater than n, then jump to after j=1 625. If j is greater than n then increment counter i 680. Check if i is greater than n 685. If i is not greater than n, then jump to after i equals 1 605. If i is not greater than n, then end.

One advantage of the present invention is that the total number of LSRs that can be traverse with an existing label stack size is increased.

Embodiments of the present invention use larger tables, but that is not a disadvantage since the table sizes are generally small when using a technology such as SPRING.

Embodiments of the present invention add some complexity with the IGP shortest path computation required to keep track of nexthops and next-nexthops for the case where only strict source routes are used. In cases where loose routing is needed or desirable, the method can still be used, but the local LSR must be able to account for the topology for all labels as outlined in FIG. 6. In the worst case, the number of label entries in the forwarding table would be on the order of $n^2$ where n is the number of LSRs in the network.

One of ordinary skill in the art will appreciate that various benefits are available as a result of the present invention. One such benefit is that embodiments of the present invention operate in conjunction with a prior art hardware.

Another benefit is that embodiments of the present invention provide increase the number of hops that can be explicitly defined.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. A multiprotocol label switching (MPLS) system, comprising:
a plurality of input/output (I/O) ports, at least a portion of which are configurable to facilitate communications with one or more devices; and
one or more processors that are communicatively coupled to the plurality of I/O ports, the one or more processors performing the steps of:
receiving, at a network node, a packet comprising a concatenated label;
responsive to the concatenated label comprising a first placeholder and an identifier that identifies the network node, performing a pop-and-lookup operation;
responsive to the concatenated label comprising no identifier that identifies the network node, keeping the same concatenated label and forwarding the packet to a first forwarding node, the first forwarding node being identified in a most significant position within the concatenated label; and
responsive to the concatenated label comprising an identifier for the network node and a second identifier for a second forwarding node, replacing the identifier for the network node with the second identifier for a second forwarding node and forwarding the packet to the second forwarding node.

2. The MPLS system in claim 1, wherein the identifier that identifies the network node is located in a most significant bit position and the first placeholder is located in a least significant bit position.

3. The MPLS system in claim 1, wherein the lookup operation comprises identifying a different concatenated label.

4. The MPLS system in claim 1, wherein keeping the same label corresponds to an MPLS swap operation.

5. The MPLS system in claim 1, wherein the first placeholder has a zero value.

6. The MPLS system in claim 1, wherein the concatenated label encodes a path for a number of hops.

7. The MPLS system in claim 1, wherein the concatenated label comprises three segments that represent three multiprotocol label switching labels.

8. The MPLS system in claim 1, further comprising a penultimate hop pop table comprising an incoming concatenated label, an outgoing concatenated label and an MPLS action used in a penultimate hop pop, the MPLS action being determined by the incoming concatenated label and the outgoing label being determined by the incoming concatenated label and the MPLS action.

9. A method for multiprotocol label switching (MPLS), the method comprising:
receiving, at a network node, a packet comprising a concatenated label;
responsive to the concatenated label comprising a first placeholder and an identifier that identifies the network node, performing a pop-and-lookup operation;
responsive to the concatenated label comprising no identifier that identifies the network node, keeping the same concatenated label and forwarding the packet to a first forwarding node, the first forwarding node being identified in a most significant position within the concatenated label; and responsive to the concatenated label comprising an identifier for the network node and a second identifier for a second forwarding node, replacing the identifier for the network node with the second identifier for a second forwarding node and forwarding the packet to the second forwarding node.

10. The method in claim 9, wherein the concatenated label is based on a plurality of MPLS label values in a label stack entry.

11. The method in claim 10, further comprising encoding a plurality of the MPLS label values in the label stack entry to enable a simultaneous lookup of two or more MPLS label values.

12. The method in claim 11, further comprising determining a MPLS action based on the concatenated label.

13. The method in claim 12, further comprising determining an outgoing concatenated label is based on the MPLS action and the concatenated label.

14. The method in claim 13, wherein the concatenated outgoing MPLS label comprises two or more segments that represent two or more MPLS labels.

15. The method in claim 14, wherein the two or more MPLS labels encode virtual links for a number of hops.

16. The method in claim 11, wherein the concatenated label uses 10 most significant bits to represent a first MPLS label and 10 least significant bits to represent a second MPLS label.

17. A multiprotocol label switching (MPLS) system comprising:
a plurality of input/output (I/O) ports, at least a portion of which are configurable to facilitate communications with one or more devices;
a non-transitory memory comprising a table, the table comprising:
an incoming concatenated label;
an outgoing concatenated label;
and a MPLS action, the MPLS action being determined by the incoming label, and the outgoing concatenated label being determined by the incoming concatenated label and the MPLS action; and
one or more processors that are communicatively coupled to the plurality of I/O ports, the one or more processors performing the steps of:
receiving, at a network node, a packet comprising a concatenated label;
responsive to the concatenated label comprising a first placeholder and an identifier that identifies the network node, performing a pop-and-lookup operation;
responsive to the concatenated label comprising no identifier that identifies the network node, keeping the same concatenated label and forwarding the packet to a first forwarding node, the first forwarding node being identified in a most significant position within the concatenated label; and
responsive to the concatenated label comprising an identifier for the network node and a second identifier for a second forwarding node, replacing the identifier for the network node with the second identifier for a second forwarding node and forwarding the packet to the second forwarding node.

18. The MPLS system in claim 17, wherein the concatenated label comprises two or more segments that represent two or more MPLS labels.

19. The MPLS system in claim 17, wherein the identifier that identifies the network node is located in a most significant bit position and the first placeholder is located in a least significant bit position.

20. The MPLS system in claim 17, wherein the concatenated outgoing label uses 10 most significant bits to represent a first MPLS label and 10 least significant bits to represent a second MPLS label.

* * * * *